United States Patent
Li (10) Patent No.: US 11,043,187 B2
(45) Date of Patent: Jun. 22, 2021

(54) ON-VEHICLE DISPLAY DEVICE, ON-VEHICLE DISPLAY METHOD AND VEHICLE

(71) Applicant: BOE TECHNOLOGY GROUP CO., LTD., Beijing (CN)

(72) Inventor: Dianmeng Li, Beijing (CN)

(73) Assignee: Boe Technology Group Co., Ltd., Beijing (CN)

( * ) Notice: Subject to any disclaimer, the term of this patent is extended or adjusted under 35 U.S.C. 154(b) by 0 days.

(21) Appl. No.: 16/633,098

(22) PCT Filed: Dec. 28, 2018

(86) PCT No.: PCT/CN2018/124853
§ 371 (c)(1),
(2) Date: Jan. 22, 2020

(87) PCT Pub. No.: WO2019/134590
PCT Pub. Date: Jul. 11, 2019

(65) Prior Publication Data
US 2020/0234676 A1 Jul. 23, 2020

(30) Foreign Application Priority Data
Jan. 2, 2018 (CN) .......................... 201810001121.6

(51) Int. Cl.
  *G09G 5/10* (2006.01)
  *G02B 27/01* (2006.01)
  *G09G 5/02* (2006.01)
(52) U.S. Cl.
  CPC ........... *G09G 5/10* (2013.01); *G02B 27/0101* (2013.01); *G09G 5/02* (2013.01);
  (Continued)

(58) Field of Classification Search
  CPC ....................................................... G09G 5/10
  (Continued)

(56) References Cited

U.S. PATENT DOCUMENTS 9,429,757 B1 * 8/2016 Peeri ................... G02B 27/0172
2010/0053222 A1 * 3/2010 Kerofsky ............. G09G 3/3406
345/690

(Continued)

FOREIGN PATENT DOCUMENTS

CN         103561223 A    2/2014
CN         204210396 U    3/2015
(Continued)

OTHER PUBLICATIONS

Office Action of CN Application No. 201810001121.6 and English translation, dated Dec. 5, 2019, 16 pages.

(Continued)

*Primary Examiner* — David T Welch
(74) *Attorney, Agent, or Firm* — Muncy, Geissler, Olds & Lowe, P.C.

(57) ABSTRACT

An on-vehicle display device, an on-vehicle display method and a vehicle are provided. The on-vehicle display device includes: a first acquisition module, configured to acquire an imaging area of an on-vehicle image; a second acquisition module, configured to acquire an ambient image in a driving direction; a processing module, configured to determine from the ambient image a background image of the imaging area an adjustment module, configured to adjust an image parameter of the on-vehicle image according to an image parameter of the background image; and a display module, configured to display in the imaging area the on-vehicle image of which the image parameter is adjusted.

11 Claims, 5 Drawing Sheets

(52) U.S. Cl.
CPC ... *G02B 2027/014* (2013.01); *G02B 2027/0112* (2013.01); *G02B 2027/0118* (2013.01); *G02B 2027/0138* (2013.01); *G09G 2320/0626* (2013.01); *G09G 2320/0666* (2013.01); *G09G 2354/00* (2013.01); *G09G 2360/144* (2013.01); *G09G 2380/10* (2013.01)

(58) Field of Classification Search
USPC .......................................................... 345/589
See application file for complete search history.

(56) References Cited

U.S. PATENT DOCUMENTS

| | | | | |
|---|---|---|---|---|
| 2010/0066832 | A1* | 3/2010 | Nagahara | G02B 7/1822 |
| | | | | 348/148 |
| 2016/0104302 | A1 | 4/2016 | Lee et al. | |
| 2017/0168295 | A1* | 6/2017 | Iwami | G06T 5/009 |
| 2018/0120572 | A1 | 5/2018 | Watanabe | |
| 2018/0203227 | A1 | 7/2018 | Xu et al. | |
| 2018/0218711 | A1* | 8/2018 | Suzuki | G09G 5/36 |
| 2018/0267307 | A1* | 9/2018 | Yoshida | G02B 27/0101 |
| 2019/0004313 | A1 | 1/2019 | Kusafuka et al. | |
| 2019/0206362 | A1 | 7/2019 | Li | |
| 2019/0250402 | A1 | 8/2019 | Chen | |

FOREIGN PATENT DOCUMENTS

| | | |
|---|---|---|
| CN | 105513537 A | 4/2016 |
| CN | 106101667 A | 11/2016 |
| CN | 106950696 A | 7/2017 |
| CN | 106970748 A | 7/2017 |
| CN | 108020923 A | 5/2018 |
| CN | 108196366 A | 6/2018 |
| CN | 108322719 A | 7/2018 |
| KR | 20180120470 A | 11/2018 |
| WO | WO-2017110942 A1 | 6/2017 |

OTHER PUBLICATIONS

International Search Report of PCT/CN2018/124853 and English translation, dated Mar. 18, 2019, 18 pages.

* cited by examiner

ON-VEHICLE DISPLAY DEVICE, ON-VEHICLE DISPLAY METHOD AND VEHICLE

CROSS-REFERENCE TO RELATED APPLICATION

This application is the U.S. national phase of PCT Application PCT/CN2018/124853 filed on Dec. 28, 2018, which claims a priority to Chinese Patent Application No. 201810001121.6 filed on Jan. 2, 2018, the disclosures of which are incorporated in their entirety by reference herein.

TECHNICAL FIELD

The present disclosure relates to the field of on-vehicle display technology, and in particular to an on-vehicle display device, an on-vehicle display method and a vehicle.

BACKGROUND

Head-up display (HUD) is an auxiliary technology for on-board display. It is able to display vehicle status information such as vehicle speed and fuel quantity, and auxiliary information such as navigation and danger warnings on the front of the driver, so as to ensure that the driver's line of sight does not deviate from the road ahead, thereby avoiding a visual blind spot caused by frequent viewing of the instrument panel, improving the driver's driving safety.

SUMMARY

An on-vehicle display device is provided in the embodiments of the present disclosure, including:
a first acquisition module, configured to acquire an imaging area of an on-vehicle image;
a second acquisition module, configured to acquire an ambient image in a driving direction;
a processing module, configured to determine from the ambient image a background image of the imaging area;
an adjustment module, configured to adjust an image parameter of the on-vehicle image according to an image parameter of the background image; and
a display module, configured to display in the imaging area the on-vehicle image of which the image parameter is adjusted.
where the image parameter of the on-vehicle image includes: a display brightness and/or a display color, the background image consists of non-repeating unit areas;
the adjustment module includes:
a first adjustment unit, configured to adjust, according to a grayscale value of the unit area in the background image, a display brightness of a display position corresponding to the unit area in the on-vehicle image; and/or
a second adjustment unit, configured to adjust, according to a color of the unit area in the background image, a display color of a display position corresponding to the unit area in the on-vehicle image.
where the display module is further configured to adjust an imaging angle of the imaging area with respect to a driver according to positions of the driver's pupils.
where the display module includes:
an image emitting source, a first mirror, a second mirror and a motor; where
the image emitting source is configured to emit to the first mirror display light of the on-vehicle image;
the first mirror is configured to reflect the display light of the on-vehicle image to the second mirror;
the second mirror is configured to reflect the display light of the on-vehicle image to the imaging area;
the motor is configured to control the first mirror and/or the second mirror to rotate to change a reflection angle of the first mirror and/or the second mirror for the display light of the on-vehicle image, to adjust the imaging angle of the imaging area with respect to the driver.
where the first acquisition module includes:
a capturing unit, configured to capture the positions of the driver's pupils;
a processing unit, configured to determine the imaging area of the on-vehicle image for the driver based on the positions of the driver's pupils and/or the imaging angle of the imaging area relative to the driver.

In addition, an on-vehicle display method is further provided in the embodiments of the present disclosure, including:
acquiring an imaging area of an on-vehicle image;
acquiring an ambient image in a driving direction;
determining from the ambient image a background image of the imaging area;
adjusting an image parameter of the on-vehicle image according to an image parameter of the background image; and
displaying in the imaging area the on-vehicle image of which the image parameter is adjusted.
where the image parameter of the on-vehicle image includes: a display brightness and/or a display color, the background image consists of non-repeating unit areas;
the adjusting the display brightness of the on-vehicle image according to the image parameter of the background image includes:
adjusting, according to a grayscale value of the unit area in the background image, a display brightness of a display position corresponding to the unit area in the on-vehicle image;
the adjusting the display color of the on-vehicle image according to the image parameter of the background image includes:
adjusting, according to a color of the unit area in the background image, a display color of a display position corresponding to the unit area in the on-vehicle image.
where the adjusting, according to the grayscale value of the unit area in the background image, the display brightness of the display position corresponding to the unit area in the on-vehicle image includes:
determining an ambient brightness value $L_{ambient}$ based on the grayscale value of the unit area in the background image;
adjusting, through a formula $$LCR = \frac{L_{display} + L_{ambient}}{L_{ambient}},$$

the display brightness of the display position corresponding to the unit area in the on-vehicle image;
where $L_{ambient}$ represents the ambient brightness value of the unit area in the background image, $L_{display}$ represents a display brightness value of the display position corresponding to the unit area in the on-vehicle image, a daytime value of the LCR is [1.15, 1.5], and a nighttime value of the LCR is [1,4].

where the on-vehicle display method further includes: adjusting an imaging angle of the imaging area with respect to a driver according to positions of the driver's pupils.

where the acquiring the imaging area of the on-vehicle image includes:

determining the positions of the driver's pupils;

determining the imaging area of the on-vehicle image for the driver based on the positions of the driver's pupils and/or the imaging angle of the imaging area relative to the driver.

In addition, a vehicle including the on-vehicle display device hereinabove is further provided in the embodiments of the present disclosure.

In addition, a n on-vehicle display device is further provided in the embodiments of the present disclosure, including a processor, a memory and a computer program stored in the memory and executable by the processor, where the computer program is executed by the processor to:

acquire an imaging area of an on-vehicle image;

acquire an ambient image in a driving direction;

determine from the ambient image a background image of the imaging area;

adjust an image parameter of the on-vehicle image according to an image parameter of the background image; and display in the imaging area the on-vehicle image of which the image parameter is adjusted.

In addition, a computer-readable storage medium is further provided in the embodiments of the present disclosure, where a computer program is stored in the computer-readable storage medium, the computer program is executed by the processor to:

acquire an imaging area of an on-vehicle image;

acquire an ambient image in a driving direction;

determine from the ambient image a background image of the imaging area;

adjust an image parameter of the on-vehicle image according to an image parameter of the background image; and display in the imaging area the on-vehicle image of which the image parameter is adjusted.

DETAILED DESCRIPTION

The technical problems, the technical solutions, and the advantages of the present disclosure will be more clearly described in conjunction with the drawings and the embodiments. In the following description, specific details such as specific configurations and components are provided only to assist in a comprehensive understanding of the embodiments of the present disclosure. It will be apparent to those skilled in the art that various changes and modifications may be made to the embodiments described herein without departing from the scope and spirit of the disclosure. In addition, descriptions of well-known functions and constructions are omitted for clarity and conciseness.

It is to be understood that the phrase "one embodiment" or "an embodiment" means that particular features, structures, or characteristics related to the embodiments may be included in at least one embodiment of the present disclosure. Thus, "in one embodiment" or "in an embodiment" in the description is not necessarily the same embodiment. In addition, these particular features, structures, or characteristics related to the embodiments may be combined into one or more embodiments in any suitable manner.

In the various embodiments of the present disclosure, it should be understood that the size of the serial numbers of the following processes does not mean the order of execution, and the order of execution of each process should be determined by its function and internal logic, and should not limit the implementation of the embodiments.

The projection of the head-up display technology in the related art is generally located on the front windshield of the vehicle, and the driver can see the external environment through the imaging area, so the external environment often interferes with the display of the projection information. For example, when a user views a high-brightness or low-brightness external environment through an imaging area, the projected content to be displayed in these areas may not be seen, thereby reducing the contrast of the viewing picture.

In view of this, there is a need for a more optimized on-vehicle display solution to overcome the above problems.

The present disclosure provides a solution to the technical issue that the projection information of the on-vehicle display in the related art is easily displayed by the external ambient image.

Figure 1:
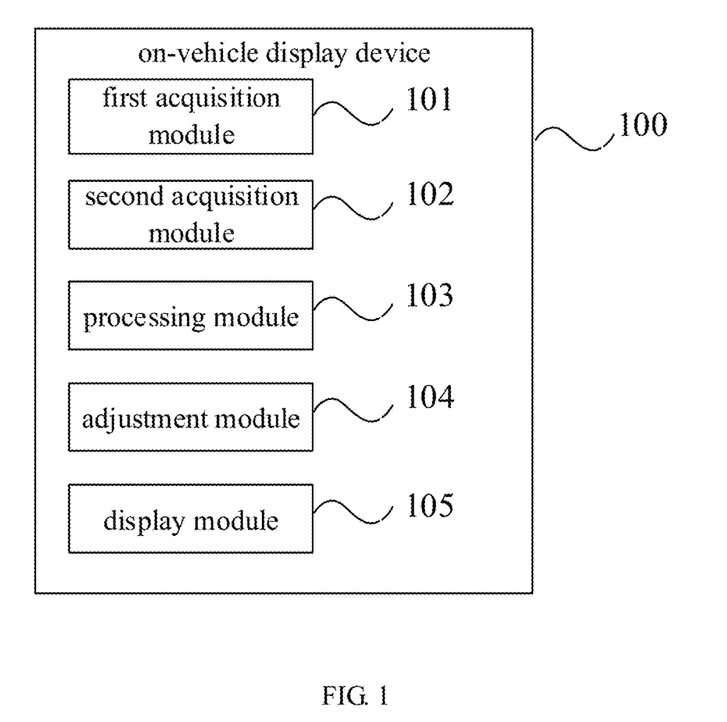
FIG. 1 is a schematic view of a logical structure of an on-vehicle display device in the embodiments of the present disclosure.

On the one hand, as shown in FIG. 1, an on-vehicle display device 100 is provided in the embodiments of the present disclosure, including:

a first acquisition module 101, configured to acquire an imaging area of an on-vehicle image;

a second acquisition module 102, configured to acquire an ambient image in a driving direction;

a processing module 103, configured to determine from the ambient image a background image of the imaging area;

an adjustment module 104, configured to adjust an image parameter of the on-vehicle image according to an image parameter of the background image; and a display module 105, configured to display in the imaging area the on-vehicle image of which the image parameter is adjusted.

According to the on-vehicle display device in the embodiments of the present disclosure, the on-vehicle display device may determine the background image that the driver may view through the on-vehicle image imaging area, and then perform image compensation on the on-vehicle image according to the image parameters of the background image, for example, increase the contrasts of the on-vehicle image and the background image, thereby avoids the background image from interfering with the driver to view the on-vehicle image, improving the driving safety to a certain extent, and thus has a high practical value.

The on-vehicle display device of the present embodiment will be described in detail below.

Specifically, the background image of the embodiment is composed of non-repeating unit areas, and the image parameters of the on-vehicle image are adjusted by using the unit area as a granularity.

In practical applications, the unit area may be a pixel area in the background image or a combination of several pixel areas in the background image. It can be understood that the smaller the unit area, the higher the granularity of the on-vehicle image may be adjusted. When the vehicle enters/exits a scene such as a tree shade or a curved road, in general, the background image in the imaging area of the on-vehicle image has a highlight portion and a lowlight portion (the highlight portion may has an average brightness greater than a preset threshold, the lowlight portion may has an average brightness less than the preset threshold). If a high-granularity unit area is used, the highlight portion and the lowlight portion of the on-vehicle image may be adjusted independently, so as to ensure that the driver may clearly view all on-vehicle image information.

Further, the image parameter of the on-vehicle image includes a display brightness and/or a display color.

For example, taking the adjusting the display brightness of the on-vehicle image as an example, the adjustment module 104 includes:

a first adjustment unit, configured to adjust, according to a grayscale value of the unit area in the background image, a display brightness of a display position corresponding to the unit area in the on-vehicle image.

For example, the first adjustment unit firstly determines an ambient brightness value $L_{ambient}$ of the unit area based on the grayscale value of the unit area in the background image;

Then, the first adjustment unit adjusts, through a formula $$LCR = \frac{L_{display} + L_{ambient}}{L_{ambient}},$$

the display brightness of the display position corresponding to the unit area in the on-vehicle image;

where LCR represents a light contrast ratio, $L_{ambient}$ represents the ambient brightness value of the unit area in the background image, $L_{display}$ represents a display brightness value of the display position corresponding to the unit area in the on-vehicle image, a daytime value of the LCR is [1.15, 1.5], and a nighttime value of the LCR is [1, 4].

After determining the value of the LCR, an appropriate display brightness value of the on-vehicle image may be calculated according to the acquired ambient brightness value $L_{ambient}$. Generally, the ambient brightness at night driving is between 0.1 cd/m² and 1 cd/m², and the maximum ambient brightness occurs in snowy days when the sunlight is strong, which may reach 34000 cd/m². In the daytime, the LCR should be between 1.15 and 1.5, and the calculated HUD display brightness should be at least 5100 cd/m², and the optimal brightness is 17000 cd/m². At night, the LCR needs to be between 1 and 4.0, and the calculated HUD display brightness should be lower than 3 cd/m².

Based on the above solution, the on-vehicle display device of the present embodiment may clearly display the on-vehicle image in the imaging area in a bright or dark environment, which greatly improves the driver's driving experience.

It should be noted that, in some embodiments, the first acquisition module 101 may be implemented by a camera in the vehicle that takes a picture of the driver and a processor; and the second acquiring module may be an on-vehicle camera for acquiring an ambient image in a driving direction.

In addition, taking the adjusting the display color of the on-vehicle image as an example, the adjustment module 104 includes:

a second adjustment unit, configured to adjust, according to a color of the unit area in the background image, a display color of a display position corresponding to the unit area in the on-vehicle image.

For example, the second adjustment unit adjusts the on-vehicle image to a display color having a higher degree of discrimination from the color in the background image, thereby ensuring that the driver may clearly view the on-vehicle image from the background image.

For example, the display color of the on-vehicle image of the warning information is generally red. When the imaging area corresponds to the red background image, the second adjustment unit may change the display color of the on-vehicle image to yellow, thereby forming a contrast with the red background.

It can be seen that, based on the first adjustment unit and the second adjustment unit, the on-vehicle display device in the embodiment may dynamically adjust the HUD display color and the display brightness, so as to ensure that the contrast of the image combined by the virtual and real images is within a suitable range. In some embodiments, the first adjustment unit and the second adjustment unit may also be implemented by a processor In addition, on the basis of the above, in order to ensure that the driver is able to view the entire content of the on-vehicle image, the display module 105 of the embodiment may also adjust an imaging angle of the imaging area with respect to a driver according to positions of the driver's pupils (i.e., adjusting the position of the imaging area suitably). During the driving process, the positions of the driver's pupils may change. Correspondingly, the position of the imaging area should also be adaptively adjusted with the positions of the driver's pupils.

Figure 2:
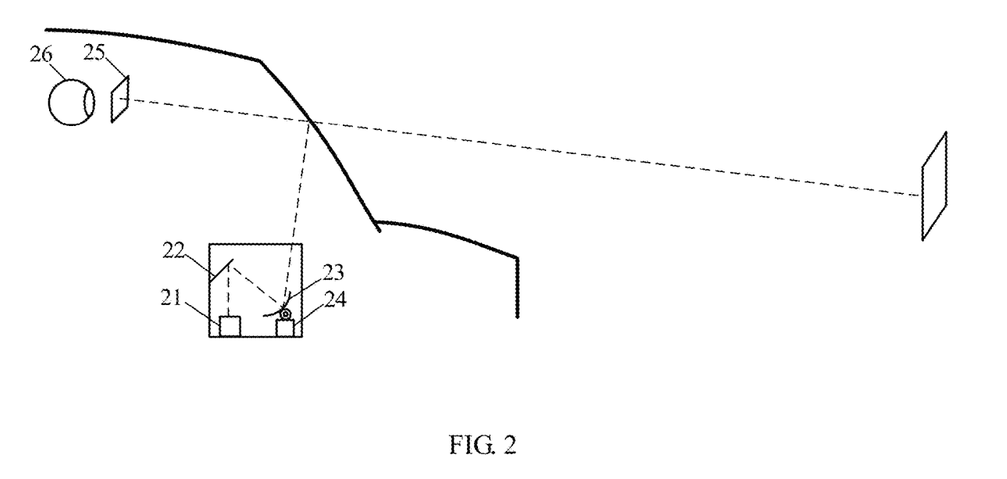
FIG. 2 is a schematic view of a working structure of a display module of an on-vehicle display device in the embodiments of the present disclosure.

Optionally, as shown in FIG. 2, the display module 105 of the on-vehicle display device in the embodiments of the present disclosure includes an image emitting source 21, a first mirror 22, a second mirror 23, a motor 24 and the motor 24.

The image emitting source 21 is configured to reflect the display light of the on-vehicle image to the first mirror 22; the first mirror 22 is configured to reflect the display light of the on-vehicle image to the second mirror 23; and the second mirror 23 is configured to reflect the display light of the on-vehicle image to the imaging area 25, so as to enable the imaging area 25 to display the on-vehicle image; the motor 24 is configured to control the first mirror 22 and/or the second mirror 23 to rotate (e.g., the second mirror 24 is connected to the motor 24 in FIG. 2), so as to change a reflection angle of the first mirror 22 and/or the second mirror 23 for the display light of the on-vehicle image, to adjust the imaging angle of the imaging area 25 with respect to the driver 26.

In practical applications, firstly, the correspondence between the position of the driver's pupil (mainly the height of the pupil in the vehicle) and the angular coordinates of the first mirror 22 and/or the second mirror 23 may be determined through a testing and calibration, and the relationship is then stored as a prior knowledge in the angle lookup table. Then, the on-vehicle display device in the embodiments may capture the position of the driver' pupil in real time, determine the corresponding adjustment angle of the first mirror 22 and/or the second mirror 23 based on the angle lookup table, and adjust the first mirror 22 and/or the second mirror 23 according to the adjustment angle, thereby ensuring that the on-vehicle image on the imaging area 25 may be always fully displayed to the driver.

In addition, based on the above, the first acquisition module 101 of the embodiment includes: a capturing unit and a processing unit.

The capturing unit is configured to capture the positions of the driver's pupils.

In practical applications, a camera may be arranged on the top of the vehicle to capture the driver's image, and the pupils may be tracked and the position coordinates may be determined by the image processing technology. Alternatively, a beam splitter and a camera may be added to the HUD device to acquire the positions of the driver's pupils through a reverse light path.

The processing unit is configured to determine the imaging area of the on-vehicle image for the driver based on the positions of the driver's pupils and/or the imaging angle of the imaging area relative to the driver. Since there is a correspondence among the imaging area, the position of the driver's pupil and the imaging angle of the imaging area with respect to the driver, so the processing unit may directly determine the imaging area of the on-vehicle image for the driver.

In some embodiments, the processing unit, the first adjustment unit and the second adjustment unit of the first acquisition module 101 may also be implemented by the same or different processors.

Figure 3:
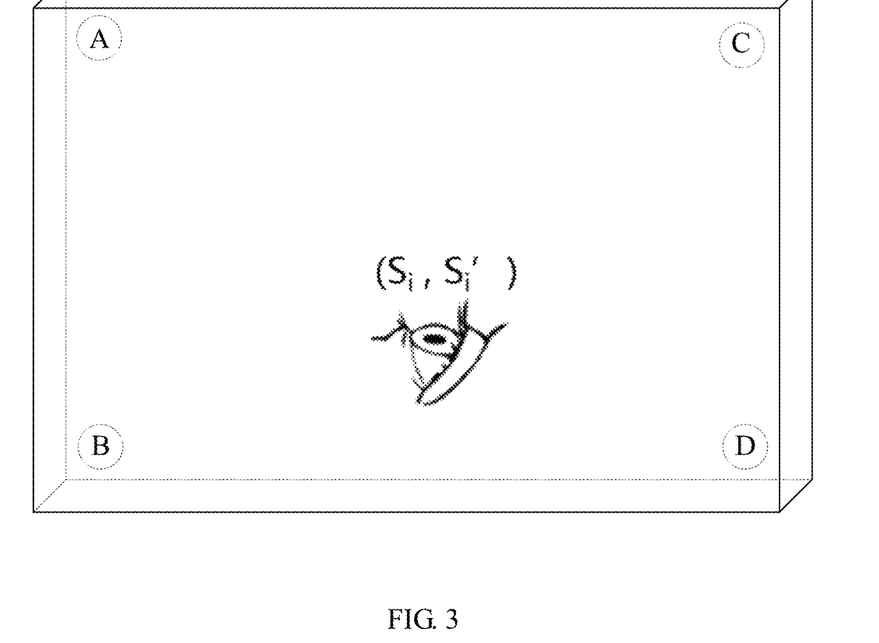
FIG. 3 is a schematic view of an imaging area of an on-vehicle display device in the embodiments of the present disclosure.

On the other hand, an on-vehicle display method is further provided in the embodiments of the present disclosure, as shown in FIG. 3, including:

Step 31: acquiring an imaging area of an on-vehicle image;

Step 32: acquiring an ambient image in a driving direction;

Step 33: determining from the ambient image a background image of the imaging area;

Step 34: adjusting an image parameter of the on-vehicle image according to an image parameter of the background image; and Step 35: displaying in the imaging area the on-vehicle image of which the image parameter is adjusted.

Obviously, the on-vehicle display method of the present embodiment corresponds to the above-described on-vehicle display device provided by the present disclosure. Therefore, the technical effect that the on-vehicle display device can achieve can also be achieved by the on-vehicle display method of the present embodiment.

Specifically, the background image of the embodiment consists of non-repeating unit areas, and the image parameters of the on-vehicle image are adjusted by using the unit area as a granularity. Specifically, the unit area may be a pixel area in the background image or a combination of several pixel areas in the background image. It can be understood that the smaller the unit area, the higher the granularity of the on-vehicle image may be adjusted. If a high-granularity unit area is used, in a practical application, when a vehicle enters/exits a scene such as a tree shade or a curved road, the background image in the imaging area generally has a highlight portion and a lowlight portion. According to the on-vehicle display method of the embodiments of the present disclosure, the highlight portion and the lowlight portion of the on-vehicle image may be adjusted independently, so as to ensure that the driver may clearly view all on-vehicle image information.

The adjusting the image parameters of the on-vehicle image may include: adjusting a display brightness and/or a display color.

For example, taking the adjusting the display brightness as an example, Step 34 specifically includes:

Step 341: adjusting, according to a grayscale value of the unit area in the background image, a display brightness of a display position corresponding to the unit area in the on-vehicle image.

For example, Step 341 may further include: determining an ambient brightness value $L_{ambient}$ of the unit area based on the grayscale value of the unit area in the background image; then, adjusting, through a formula $$LCR = \frac{L_{display} + L_{ambient}}{L_{ambient}},$$

the display brightness of the display position corresponding to the unit area in the on-vehicle image;

where $L_{ambient}$ represents the ambient brightness value of the unit area in the background image, $L_{display}$ represents a display brightness value of the display position corresponding to the unit area in the on-vehicle image, a daytime value of the LCR is [1.15, 1.5], and a nighttime value of the LCR is [1, 4].

Generally, the ambient brightness at night driving is between 0.1 cd/m² and 1 cd/m², and the maximum ambient brightness occurs in snowy days when the sunlight is strong, which may reach 34000 cd/m². In the daytime, the LCR should be between 1.15 and 1.5, and the calculated HUD display brightness should be at least 5100 cd/m², and the optimal brightness is 17000 cd/m². At night, the LCR needs to be between 1 and 4.0, and the calculated HUD display brightness should be lower than 3 cd/m².

Based on the above LCR, it is able to ensure that the on-vehicle display device may clearly display the on-vehicle image in a bright or dark environment, which greatly improves the driver's driving experience.

In some embodiments of the present disclosure, the adjusting, according to the grayscale value of the unit area in the background image, the display brightness of the display position corresponding to the unit area in the on-vehicle image may include:

comparing the brightness of all the pixel points of the display position corresponding to the unit area in the on-vehicle image with a threshold value to obtain a comparison result, and adjusting, according to the comparison result, the brightness of all the pixel points of the display position corresponding to the unit area in the on-vehicle image.

In addition, taking the adjusting the display color as an example, Step 34 specifically includes:

Step 342: adjusting, according to a color of the unit area in the background image, a display color of a display position corresponding to the unit area in the on-vehicle image.

For example, the second adjustment unit adjusts the on-vehicle image to a display color having a higher degree of discrimination from the color in the background image, thereby ensuring that the driver may clearly view the on-vehicle image from the background image.

For example, the display color of the on-vehicle image of the warning information is generally red. When the imaging area corresponds to the red background image, the second adjustment unit may change the display color of the on-vehicle image to yellow (only for illustration), thereby forming a contrast with the red background.

In some embodiments of the present disclosure, the adjusting, according to the color of the unit area in the background image, the display color of the display position corresponding to the unit area in the on-vehicle image may include:

comparing the colors of all the pixel points of the display position corresponding to the unit area in the on-vehicle image with a threshold value to obtain a comparison result, and adjusting, according to the comparison result, the colors of all the pixel points of the display position corresponding to the unit area in the on-vehicle image.

It can be seen that, according to the on-vehicle display method of the embodiments of the present disclosure, it is able to dynamically adjust the HUD display color and the display brightness, so as to ensure that the contrast ratio of the image combined by the virtual and real images is within a suitable range.

In addition, on the basis of the above, in order to ensure that the driver may view the on-vehicle image normally, the vehicle display method may further include:

Step 36: adjusting an imaging angle of the imaging area with respect to a driver according to positions of the driver's pupils.

In practical applications, firstly, the correspondence between the position of the driver's pupil (mainly the height of the pupil in the vehicle) and the imaging angle of the imaging area with respect to the driver may be determined through a testing and calibration, and the correspondence is then stored as a prior knowledge. According to the on-vehicle display method in the embodiments of the present disclosure, the position of the driver' pupil may be captured in real time, and the imaging angle of the imaging area with respect to the driver may be retrieved from the stored correspondence, and then the imaging angle may be adjusted based on the retrieved imaging angle, so that the image area may be adjusted adaptively based on the positions of the driver's pupils in real time, thereby ensuring that the on-vehicle display information may be fully displayed to the driver.

Based on the above description, since there is a correspondence among the imaging area, the position of the driver's pupil and the imaging angle of the imaging area with respect to the driver, so when Step 31 is performed, it is able to directly determine the imaging area of the on-vehicle image for the driver based on the position of the driver's pupil and/or the imaging angle of the imaging area with respect to the driver After the imaging area of the driver is determined, Step 32 may be performed to acquire an ambient image in the driving direction.

As an example of Step 32, as shown in FIG. 3, the imaging area is assumed to be a rectangle, and the four corners of the rectangle respectively correspond to four preset collection positions A, B, C, and D;

In the embodiments of the present disclosure, the environment in the driving direction of the vehicle may be photographed in four preset collection positions A, B, C, and D respectively, to obtain four shooting images;

Then, the four images are spliced together to obtain an ambient image, which includes:

determining a upper left corner anchor point, a bottom left corner anchor point, an upper right corner anchor point and a bottom right corner anchor point of the given position.

splicing the image captured at the preset acquisition position A on the upper left corner of the imaging area to make its center position to coincide with the upper left corner anchor point;

splicing the image captured at the preset acquisition position B on the upper right corner of the imaging area to make its center position to coincide with the upper right corner anchor point;

splicing the image captured at the preset acquisition position C on the bottom left corner of the imaging area to make its center position to coincide with the bottom left corner anchor point; and splicing the image captured at the preset acquisition position D on the bottom right corner of the imaging area to make its center position to coincide with the bottom right corner anchor point.

After the above images are spliced together, the ambient image is obtained.

Figure 4A:
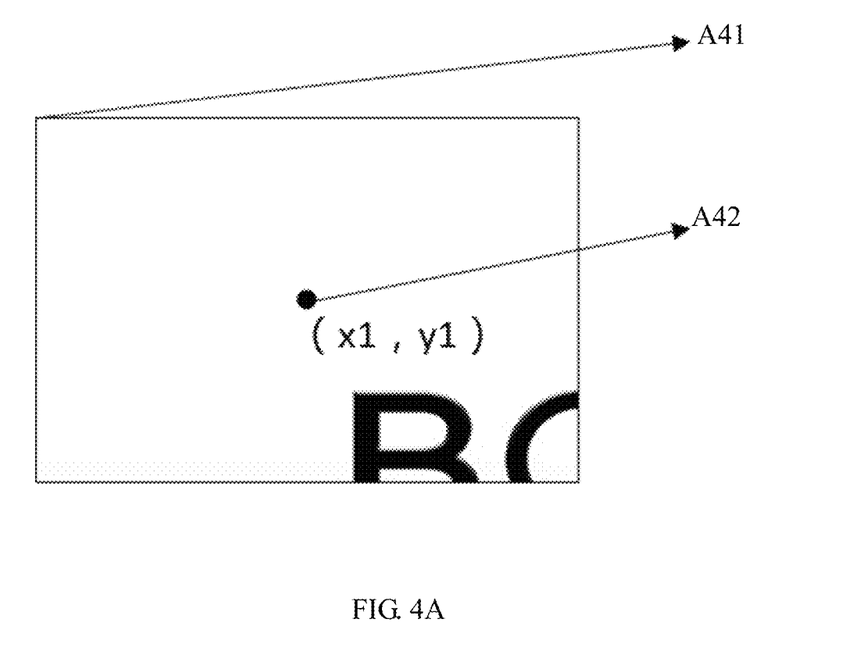
FIG. 4A is a photographing screen taken by the on-vehicle display device at the collection position A in the embodiments of the present disclosure.

As a description of the splicing of the ambient images, referring to FIG. 4A which is a photographing image captured at the preset acquisition position A on the upper left corner of the imaging area, where the origin coordinate A41 is the upper left corner of the photographing image, and the central coordinate A42 is (x1, y1).

Figure 4B:
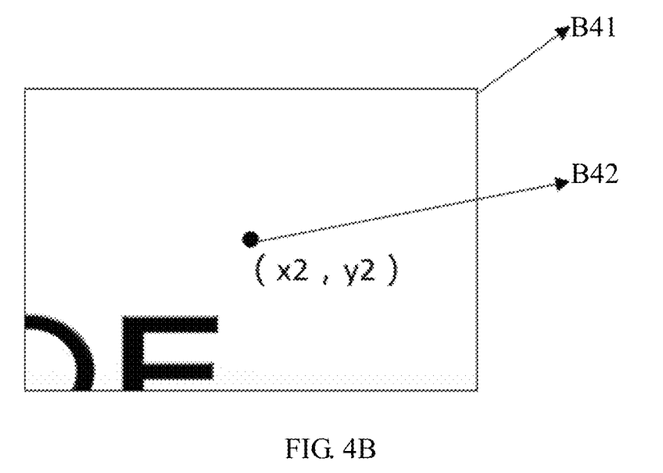
FIG. 4B is a photographing screen taken by the on-vehicle display device at the collection position B in the embodiments of the present disclosure.

Referring to FIG. 4B which is a photographing image captured at the preset acquisition position B on the upper right corner of the imaging area, where the origin coordinate B41 is the upper right corner of the photographing image, and the central coordinate B42 is (x2, y2).

Figure 4C:
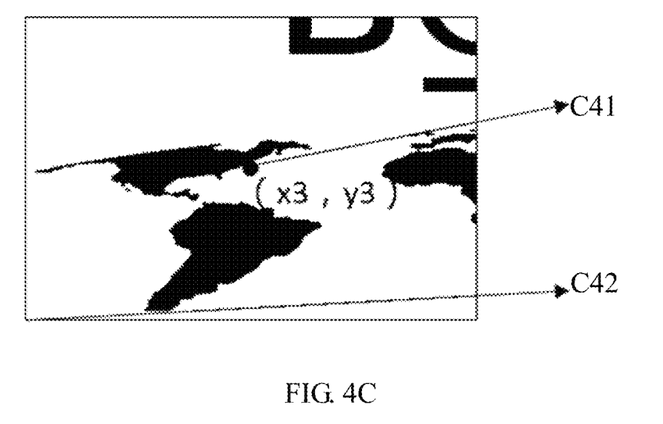
FIG. 4C is a photographing screen taken by the on-vehicle display device at the collection position C in the embodiments of the present disclosure.

Referring to FIG. 4C which is a photographing image captured at the preset acquisition position C on the bottom left corner of the imaging area, where the origin coordinate C41 is the bottom left corner of the photographing image, and the central coordinate C42 is (x3, y3).

Figure 4D:
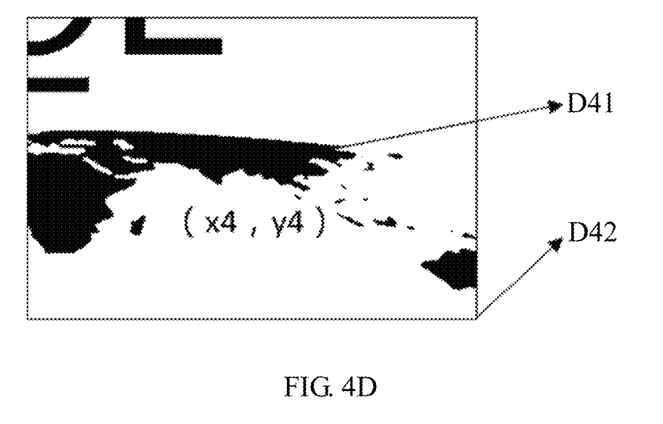
FIG. 4D is a photographing screen taken by the on-vehicle display device at the collection position D in the embodiments of the present disclosure.

Referring to FIG. 4D which is a photographing image captured at the preset acquisition position D on the bottom right corner of the imaging area, where the origin coordinate D41 is the bottom right corner of the photographing image, and the central coordinate D42 is (x4, y4).

Figure 4E:
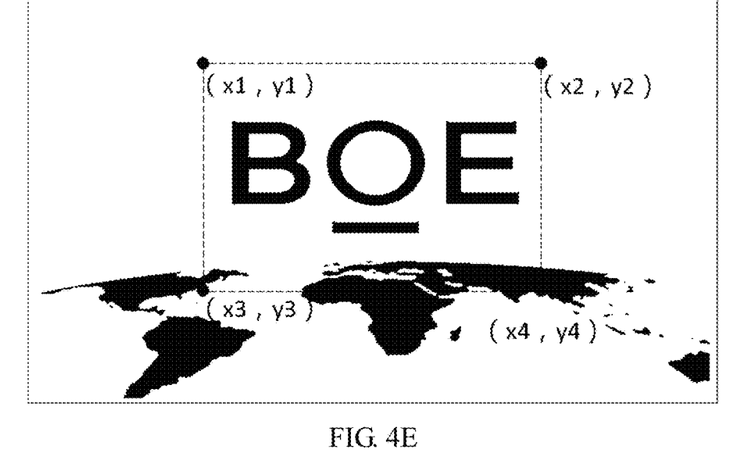
FIG. 4E is a schematic view of splicing a shooting picture taken by the on-vehicle display device at the collection positions A, B, C, and D in the embodiments of the present disclosure.

The four photographing images of FIG. 4A to FIG. 4D are overlapped according to the respective center coordinates and the upper left corner anchor point, the bottom left corner anchor point, the upper right corner anchor point and the bottom right corner anchor point with the preset values, and then the ambient image shown in FIG. 4E is obtained.

It can be seen that, based on the above steps, the images captured at the four corner positions of the imaging area may be spliced together to form an ambient image, and redundant parts in the image may be effectively filtered out.

After determining the ambient image in the driving direction, Step 33 will be performed.

Figure 5A:
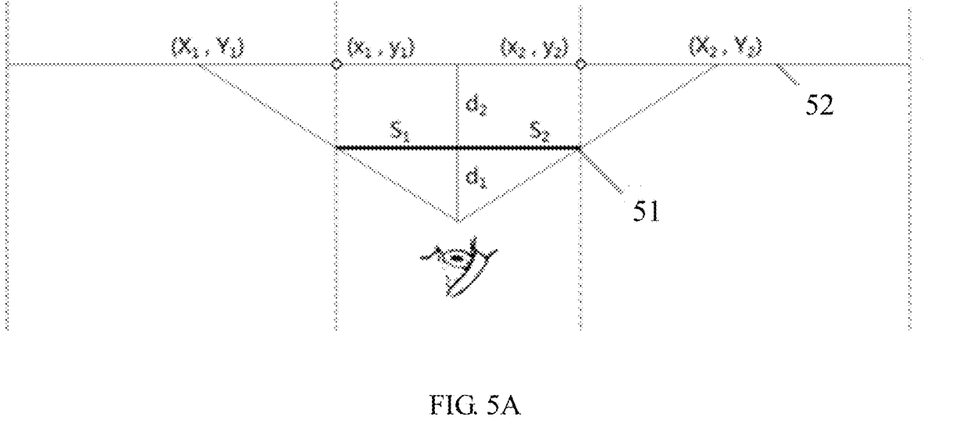
FIG. 5A is a schematic view showing a positional relationship among a driver, an imaging area, and an ambient screen in an on-vehicle display device in the embodiments of the present disclosure.
Figure 5B:
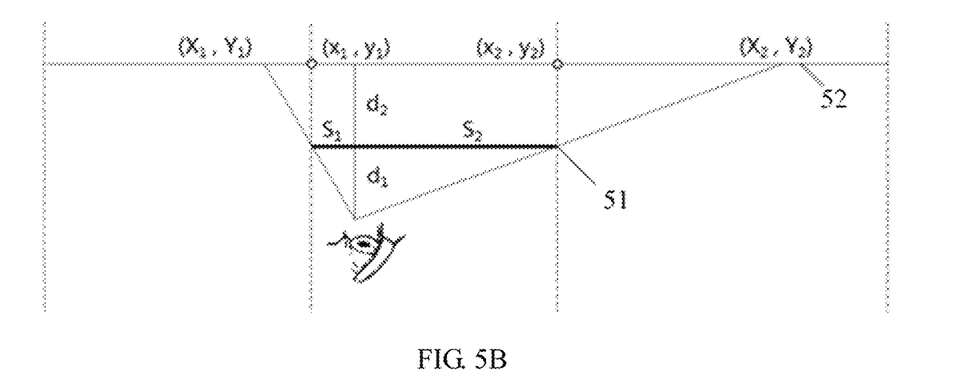
FIG. 5B is a schematic view of another positional relationship among a driver, an imaging area, and an ambient screen in an on-vehicle display device in the embodiments of the present disclosure.
Figure 5C:
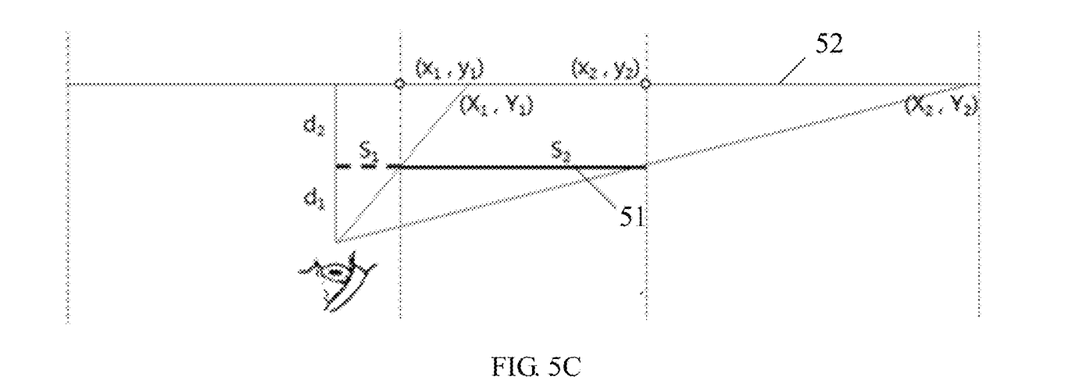
FIG. 5C is a schematic view of another positional relationship among a driver, an imaging area, and an ambient screen in an on-vehicle display device in the embodiments of the present disclosure.

For example, in practical applications, referring to FIGS. 5A-5C, the position of the driver's pupil represents the driver's viewing position, and FIGS. 5A-5C show respectively the relationship among the driver's position, imaging area 51 and the ambient image 52.

Based on the above positional relationship, combined with the geometric principle, referring to FIG. 3, the user is positioned at the preset acquisition positions A, B, C, and D respectively, so as to generate coordinates of the four corners (Si, Si') of the user relative to the imaging area, where i=1, 2, 3, 4, representing four corners respectively.

The coordinates (Xi, Yi) of the four corners of the background image is then determined according to the formulas $$Y_i = y_i - \frac{s_1 d_2}{d_1} \text{ and } X_i = x_i - \frac{s_1 d_2}{d_1};$$

The background image is extracted from the ambient image according to the coordinates (Xi, Yi) of the four corners of the background image;

where d1 is the vertical distance from the driver to the imaging area; d2 is the vertical distance from the imaging area to the ambient image; (xi, yi) represents the coordinates of the four corners of the orthographic projections of the imaging area onto the ambient image.

Figure 6:
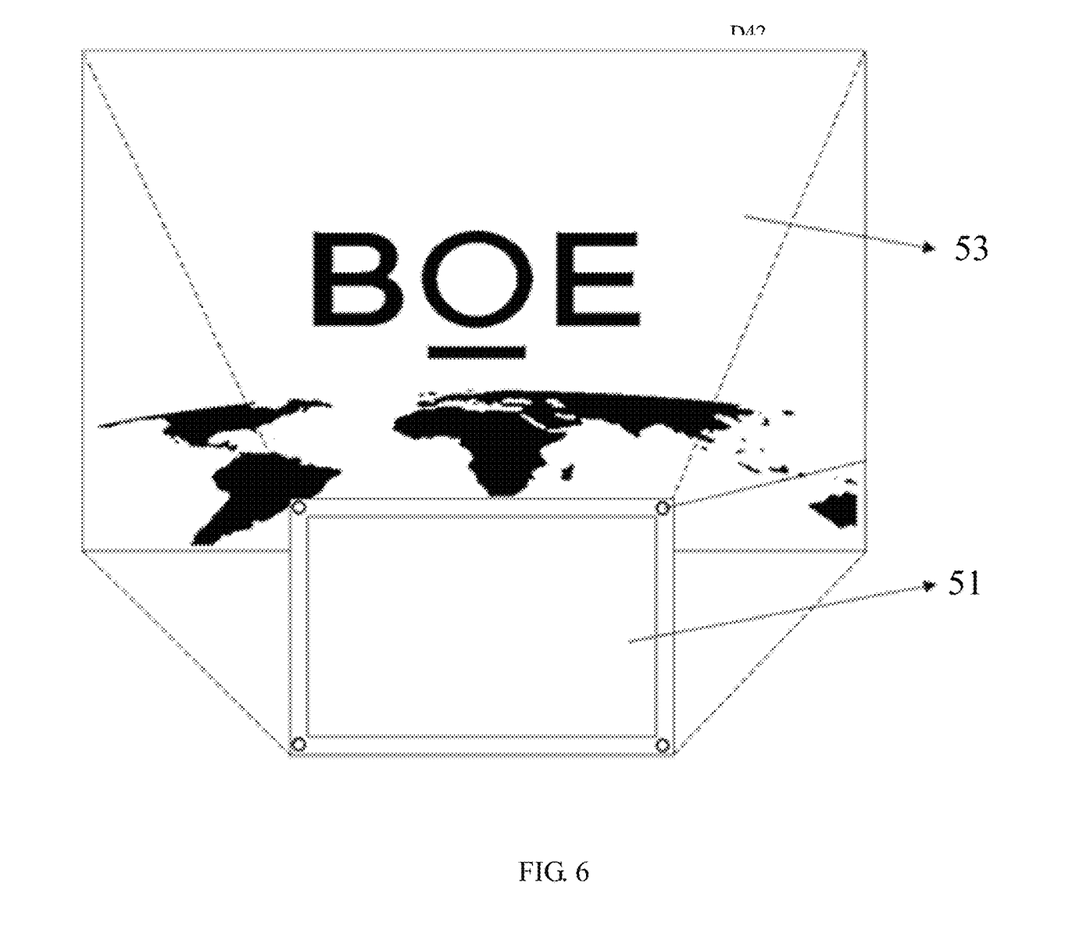
FIG. 6 is a schematic view of a positional relationship among an imaging area and a background image in an on-vehicle display device in the embodiments of the present disclosure.

Taking the ambient image shown in FIG. 4 as an example, based on the above method, the positional relationship between the imaging area 51 and the background image 53 shown in FIG. 6 may be determined.

The above is only used to prove that the on-vehicle display method in the embodiments of the present disclosure where the ambient image is acquired and the background image is determined based on the imaging area is applicable, and does not limit the scope of the present disclosure. As another feasible solution, it is also able to directly extract the corresponding background image from the ambient image according to the imaging angle of the imaging area relative to the driver, that is, there is a correspondence between the extracted area of the background image and the imaging angle of the imaging area relative to the driver, and this correspondence may be used as a priori knowledge of the present disclosure.

In summary, according to the on-vehicle display method in the embodiments of the present disclosure, it is able to detect the brightness and color of the background image that the driver may view from the imaging area, and adjust the display brightness and color of the on-vehicle image in real time, so as to ensure the visual effect to be best, thereby improving the driver's viewing experience, helping the driver to be concentrate to a certain extent and ensuring the safe driving.

Further, a vehicle is further provided in the embodiments of the present disclosure, including the above-described on-vehicle display device provided by the present disclosure.

Based on the on-vehicle display device, the vehicle in the embodiments of the present disclosure may actively determine the environment that the driver observes through the imaging area acquiring the on-vehicle image, and adjust the image parameters of the on-vehicle image according to the environment, thereby reducing display interference of the external environment to the on-vehicle image, helping the driver to be concentrate to a certain extent and ensuring the safe driving.

In addition, an on-vehicle display device is further provided in the embodiments of the present disclosure, including a processor, a memory and a computer program stored in the memory and executable by the processor;

the computer program is executed by the processor to:
acquire an imaging area of an on-vehicle image;
acquire an ambient image in a driving direction;
determine from the ambient image a background image that the drive may observe through the imaging area;
adjust an image parameter of the on-vehicle image according to an image parameter of the background image; and
display in the imaging area the on-vehicle image of which the image parameter is adjusted.

Optionally, the image parameter of the on-vehicle image includes: a display brightness and/or a display color, the background image consists of non-repeating unit areas, the computer program is executed by the processor to:
adjust, according to a grayscale value of the unit area in the background image, a display brightness of a display position corresponding to the unit area in the on-vehicle image;
and/or
adjust, according to a color of the unit area in the background image, a display color of a display position corresponding to the unit area in the on-vehicle image.

Optionally, the adjusting, according to the grayscale value of the unit area in the background image, the display brightness of the display position corresponding to the unit area in the on-vehicle image performed when the computer program is executed by the processor, includes:
determine an ambient brightness value $L_{ambient}$ based on the grayscale value of the unit area in the background image;
adjust, through a formula $$LCR = \frac{L_{display} + L_{ambient}}{L_{ambient}},$$

the display brightness of the display position corresponding to the unit area in the on-vehicle image;
where $L_{ambient}$ represents the ambient brightness value of the unit area in the background image, $L_{display}$ represents a display brightness value of the display position corresponding to the unit area in the on-vehicle image, a daytime value of the LCR is [1.15, 1.5], and a nighttime value of the LCR is [1,4].

Optionally, the computer program is executed by the processor to:
adjust an imaging angle of the imaging area with respect to a driver according to positions of the driver's pupils.

Optionally, the acquiring the imaging area of the on-vehicle image performed when the computer program is executed by the processor, includes:
  determine the positions of the driver's pupils;
  determine the imaging area of the on-vehicle image for the driver based on the positions of the driver's pupils and/or the imaging angle of the imaging area relative to the driver.

Furthermore, a computer-readable storage medium having a computer program stored thereon is further provided in the embodiments of the present disclosure, the computer program is executed by the processor to:
  acquire an imaging area of an on-vehicle image;
  acquire an ambient image in a driving direction;
  determine from the ambient image a background image that the drive may observe through the imaging area;
  adjust an image parameter of the on-vehicle image according to an image parameter of the background image; and
  display in the imaging area the on-vehicle image of which the image parameter is adjusted.

Optionally, the image parameter of the on-vehicle image includes: a display brightness and/or a display color, the background image consists of non-repeating unit areas, the computer program is executed by the processor to:
  adjust, according to a grayscale value of the unit area in the background image, a display brightness of a display position corresponding to the unit area in the on-vehicle image;
  and/or
  adjust, according to a color of the unit area in the background image, a display color of a display position corresponding to the unit area in the on-vehicle image.

Optionally, the adjusting, according to the grayscale value of the unit area in the background image, the display brightness of the display position corresponding to the unit area in the on-vehicle image performed when the computer program is executed by the processor, includes:
  determine an ambient brightness value $L_{ambient}$ based on the grayscale value of the unit area in the background image;
  adjust, through a formula $$LCR = \frac{L_{display} + L_{ambient}}{L_{ambient}},$$

the display brightness of the display position corresponding to the unit area in the on-vehicle image;
  where $L_{ambient}$ represents the ambient brightness value of the unit area in the background image, $L_{display}$ represents a display brightness value of the display position corresponding to the unit area in the on-vehicle image, a daytime value of the LCR is [1.15, 1.5], and a nighttime value of the LCR is [1,4].

Optionally, the computer program is executed by the processor to:
  adjust an imaging angle of the imaging area with respect to a driver according to positions of the driver's pupils.

Optionally, the acquiring the imaging area of the on-vehicle image performed when the computer program is executed by the processor, includes:
  determine the positions of the driver's pupils;
  determine the imaging area of the on-vehicle image for the driver based on the positions of the driver's pupils and/or the imaging angle of the imaging area relative to the driver.

The above are merely some embodiments of the present disclosure. A person skilled in the art may make further modifications and improvements without departing from the principle of the present disclosure, and these modifications and improvements shall also fall within the scope of the present disclosure.

What is claimed is:

1. An on-vehicle display device, comprising a processor, a memory and a computer program stored in the memory and executable by the processor, wherein the computer program is executed by the processor to:
  acquire an imaging area of an on-vehicle image;
  acquire an ambient image in a driving direction;
  determine from the ambient image a background image of the imaging area;
  adjust an image parameter of the on-vehicle image according to an image parameter of the background image;
  display in the imaging area the on-vehicle image of which the image parameter is adjusted, the image parameter of the on-vehicle image comprising a display brightness and/or a display color, the background image consisting of non-repeating unit areas;
  adjust, according to a grayscale value of the unit area in the background image, the display brightness of a display position corresponding to the unit area in the on-vehicle image;
  determine an ambient brightness value $L_{ambient}$ of the unit area based on the grayscale value of the unit area in the background image; and
  adjust, through a formula light contrast ratio $$(LCR) = \frac{L_{display} + L_{ambient}}{L_{ambient}},$$

the display brightness of the display position corresponding to the unit area in the on-vehicle image,
  wherein $L_{ambient}$ represents the ambient brightness value of the unit area in the background image, $L_{display}$ represents a display brightness value of the display position corresponding to the unit area in the on-vehicle image, a daytime value of the LCR is between 1.15 and 1.5, and a nighttime value of the LCR is between 1.0 and 4.0.

2. The on-vehicle display device according to claim 1, wherein the computer program is executed by the processor to:
  adjust, according to a color of the unit area in the background image, a display color of a display position corresponding to the unit area in the on-vehicle image.

3. The on-vehicle display device according to claim 1, wherein the computer program is executed by the processor to adjust an imaging angle of the imaging area with respect to a driver according to positions of the driver's pupils.

4. The on-vehicle display device according to claim 3, further comprising:
  an image emitting source, a first mirror, a second mirror and a motor; wherein
  the image emitting source is configured to emit to the first mirror display light of the on-vehicle image;
  the first mirror is configured to reflect the display light of the on-vehicle image to the second mirror;
  the second mirror is configured to reflect the display light of the on-vehicle image to the imaging area;
  the motor is configured to control the first mirror and/or the second mirror to rotate to change a reflection angle of the first mirror and/or the second mirror for the display light of the on-vehicle image, to adjust the imaging angle of the imaging area with respect to the driver.

5. The on-vehicle display device according to claim 3, wherein the computer program is executed by the processor to:
capture the positions of the driver's pupils;
determine the imaging area of the on-vehicle image for the driver based on the positions of the driver's pupils and/or the imaging angle of the imaging area relative to the driver.

6. An on-vehicle display method, comprising:
acquiring an imaging area of an on-vehicle image;
acquiring an ambient image in a driving direction;
determining from the ambient image a background image of the imaging area;
adjusting an image parameter of the on-vehicle image according to an image parameter of the background image; and
displaying in the imaging area the on-vehicle image of which the image parameter is adjusted,
wherein the image parameter of the on-vehicle image comprises: a display brightness and/or a display color, the background image consists of non-repeating unit areas,
wherein the adjusting the display brightness of the on-vehicle image according to the image parameter of the background image comprises:
adjusting, according to a grayscale value of the unit area in the background image, a display brightness of a display position corresponding to the unit area in the on-vehicle image,
wherein the adjusting, according to the grayscale value of the unit area in the background image, the display brightness of the display position corresponding to the unit area in the on-vehicle image comprises:
determining an ambient brightness value $L_{ambient}$ of the unit area based on the grayscale value of the unit area in the background image; and
adjusting, through a formula light contrast ratio $$(LCR) = \frac{L_{display} + L_{ambient}}{L_{ambient}},$$

the display brightness of the display position corresponding to the unit area in the on-vehicle image, and
wherein $L_{ambient}$ represents the ambient brightness value of the unit area in the background image, $L_{display}$ represents a display brightness value of the display position corresponding to the unit area in the on-vehicle image, a daytime value of the LCR is between 1.15 and 1.5, and a nighttime value of the LCR is between 1.0 and 4.0.

7. The on-vehicle display method according to claim 6, wherein
the adjusting the display color of the on-vehicle image according to the image parameter of the background image comprises:

adjusting, according to a color of the unit area in the background image, a display color of a display position corresponding to the unit area in the on-vehicle image.

8. The on-vehicle display method according to claim 6, further comprising: adjusting an imaging angle of the imaging area with respect to a driver according to positions of the driver's pupils.

9. The on-vehicle display method according to claim 8, wherein the acquiring the imaging area of the on-vehicle image comprises:
determining the positions of the driver's pupils;
determining the imaging area of the on-vehicle image for the driver based on the positions of the driver's pupils and/or the imaging angle of the imaging area relative to the driver.

10. A vehicle comprising the on-vehicle display device according to claim 1.

11. A non-transitory computer-readable storage medium, wherein a computer program is stored in the computer-readable storage medium, the computer program is executed by a processor to:
acquire an imaging area of an on-vehicle image;
acquire an ambient image in a driving direction;
determine from the ambient image a background image of the imaging area;
adjust an image parameter of the on-vehicle image according to an image parameter of the background image; and
display in the imaging area the on-vehicle image of which the image parameter is adjusted, the image parameter of the on-vehicle image comprising a display brightness and/or a display color, the background image consisting of non-repeating unit areas;
adjust, according to a grayscale value of the unit area in the background image, a display brightness of a display position corresponding to the unit area in the on-vehicle image;
determine an ambient brightness value $L_{ambient}$ of the unit area based on the grayscale value of the unit area in the background image; and
adjust, through a formula light contrast ratio $$(LCR) = \frac{L_{display} + L_{ambient}}{L_{ambient}},$$

the display brightness of the display position corresponding to the unit area in the on-vehicle image,
wherein $L_{ambient}$ represents the ambient brightness value of the unit area in the background image, $L_{display}$ represents a display brightness value of the display position corresponding to the unit area in the on-vehicle image, a daytime value of the LCR is between 1.15 and 1.5, and a nighttime value of the LCR is between 1.0 and 4.0.

* * * * *